US011833859B2

(12) United States Patent
Ishihara

(10) Patent No.: US 11,833,859 B2
(45) Date of Patent: Dec. 5, 2023

(54) PNEUMATIC TIRE

(71) Applicant: Toyo Tire Corporation, Itami (JP)

(72) Inventor: Seiya Ishihara, Itami (JP)

(73) Assignee: Toyo Tire Corporation, Itami (JP)

( * ) Notice: Subject to any disclaimer, the term of this patent is extended or adjusted under 35 U.S.C. 154(b) by 14 days.

(21) Appl. No.: 17/547,613

(22) Filed: Dec. 10, 2021

(65) Prior Publication Data

US 2022/0194135 A1     Jun. 23, 2022

(30) Foreign Application Priority Data

Dec. 21, 2020    (JP) ................................ 2020-211100

(51) Int. Cl.
     *B60C 11/03*      (2006.01)
     *B60C 11/12*      (2006.01)

(52) U.S. Cl.
CPC ...... *B60C 11/0304* (2013.01); *B60C 11/0306* (2013.01); *B60C 11/1204* (2013.01); *B60C 11/1236* (2013.01); *B60C 2011/0346* (2013.01); *B60C 2011/1213* (2013.01); *B60C 2011/1245* (2013.01)

(58) Field of Classification Search
CPC ............. B60C 11/0304; B60C 11/0306; B60C 11/1204; B60C 11/1236; B60C 2011/0346; B60C 2011/1213; B60C 2011/1245; B60C 2011/1254; B60C 11/12
See application file for complete search history.

(56) References Cited

U.S. PATENT DOCUMENTS

| | | | | |
|---|---|---|---|---|
| 5,660,651 | A | * | 8/1997 | Diensthuber ......... B60C 11/033 152/DIG. 3 |
| 2012/0085471 | A1 | * | 4/2012 | Horiguchi ........... B60C 11/0306 152/209.9 |
| 2016/0152091 | A1 | * | 6/2016 | Yoshida .............. B60C 11/0306 152/209.18 |
| 2018/0297416 | A1 | * | 10/2018 | Ninomiya ........... B60C 11/1204 |

FOREIGN PATENT DOCUMENTS

| | | | | |
|---|---|---|---|---|
| DE | | 19957914 A1 | * 6/2001 | ......... B60C 11/0302 |
| JP | | 2010-247708 A | 11/2010 | |
| JP | | 2020082861 A | * 6/2020 | |

OTHER PUBLICATIONS

Kimishima, English Machine Translation of JP 2020082861, 2020 (Year: 2020).*
Diensthuber, English Machine Translation of DE 19957914, 2001 (Year: 2001).*

* cited by examiner

*Primary Examiner* — Justin R Fischer
*Assistant Examiner* — Brendon Charles Darby
(74) *Attorney, Agent, or Firm* — WHDA, LLP

(57) ABSTRACT

In a pneumatic tire, a first shoulder block comprises at least one first shoulder circumferential groove which extends in a tire circumferential direction, the at least one first shoulder circumferential groove is respectively separated from a pair of first shoulder slits, a center block comprises at least one center circumferential groove which extends in the tire circumferential direction, and the at least one center circumferential groove is respectively contiguous with a pair of center slits.

20 Claims, 8 Drawing Sheets

PNEUMATIC TIRE

CROSS REFERENCE TO RELATED APPLICATIONS

This application claims the benefit of priority of Japanese application no. 2020-211100, filed on Dec. 21, 2020, which is incorporated herein by reference.

BACKGROUND OF THE INVENTION

Field of the Invention

The present disclosure relates to a pneumatic tire.

Description of the Related Art

Conventionally a pneumatic tire might, for example, comprise a plurality of main grooves extending in the tire circumferential direction, and a plurality of lands which are partitioned by the plurality of main grooves and a pair of contact patch ends (e.g., JP 2010-247708 A). In addition, lands might comprise a plurality of slits extending so as to span the tire axial direction, and a plurality of blocks which are partitioned by the plurality of slits.

Blocks might comprise a plurality of circumferential grooves that extend in the tire circumferential direction, all of the circumferential grooves being separated from the slits. This will make it possible to suppress reduction in rigidity at end portions in the tire circumferential direction of the blocks. However, because circumferential groove length will be small, it will not be possible to increase traction attributable to edges of circumferential grooves. It will therefore not be possible to adequately improve performance on snowy road surfaces.

SUMMARY OF THE INVENTION

It is therefore an object of the present disclosure to provide a pneumatic tire permitting improvement in performance on snowy road surfaces while ensuring rigidity of blocks.

There is provided a pneumatic tire comprises a plurality of main grooves extending in a tire circumferential direction, and a plurality of lands which are partitioned by the plurality of main grooves and a pair of contact patch ends, wherein:

the plurality of lands comprise first and second shoulder lands which are arranged so as to be outwardmost in a tire axial direction, and a center land which is arranged nearest to a tire equatorial plane;

the first shoulder land comprises a plurality of first shoulder slits which each extend across a full width of the first shoulder land in the tire axial direction, and a first shoulder block which is partitioned by a pair of first shoulder slits which among the plurality of first shoulder slits are mutually adjacent in the tire circumferential direction;

the first shoulder block comprises at least one first shoulder circumferential groove which extends in the tire circumferential direction;

the at least one first shoulder circumferential groove is respectively separated from the pair of first shoulder slits;

the center land comprises a plurality of center slits which each extend across a full width of the center land in the tire axial direction, and a center block which is partitioned by a pair of center slits which among the plurality of center slits are mutually adjacent in the tire circumferential direction;

the center block comprises at least one center circumferential groove which extends in the tire circumferential direction; and the at least one center circumferential groove is respectively contiguous with the pair of center slits.

DETAILED DESCRIPTION OF THE INVENTION

Figure 1:
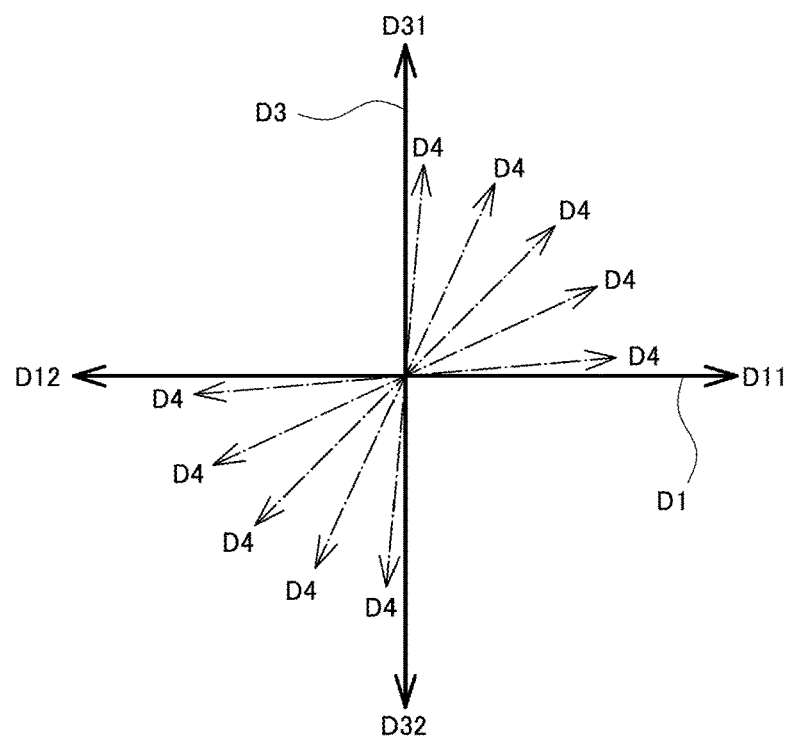
FIG. 1 is a drawing for explaining a first inclined direction.

Below, an embodiment of a pneumatic tire is described with reference to FIG. 1 through FIG. 9. At the respective drawings, note that dimensional ratios at the drawings and actual dimensional ratios are not necessarily consistent, and note further that dimensional ratios are not necessarily consistent from drawing to drawing.

Note that the respective dimensions, positional relationships, relative magnitudes, and so forth that are indicated below should be understood to be as measured under normal conditions when the pneumatic tire (hereinafter also referred to as simply "tire") 1 mounted on a normal rim 30 and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of IRA, or "inflation pressure" in the case of ETRTO.

At the respective drawings, first direction D1 is the tire axial direction D1 which is parallel to the tire rotational axis that is the center of rotation of tire 1, second direction D2 is the tire radial direction D2 which is the direction of the diameter of tire 1, and third direction D3 is the tire circumferential direction D3 which is circumferential with respect to the rotational axis of the tire.

Toward the interior in the tire axial direction D1 means nearer to tire equatorial plane S1, and toward the exterior in the tire axial direction D1 means farther away from tire equatorial plane S1. Furthermore, the side toward the interior in the tire radial direction D2 is the side which is nearer to the tire rotational axis, and the side toward the exterior in the tire radial direction D2 is the side which is farther away from the tire rotational axis.

First direction D11 of tire axial direction D1 is also referred to as first axial direction D11; second direction D12 of tire axial direction D1 is also referred to as second axial direction D12. Furthermore, first direction D31 of tire circumferential direction D3 is also referred to as first circumferential direction D31; second direction D32 of tire circumferential direction D3 is also referred to as second circumferential direction D32.

Tire equatorial plane S1 refers to a plane that is located centrally in the tire axial direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the line formed by the intersection of tire equatorial plane S1 and the outer surface (tread surface 2a, described below) in the tire radial direction D2 of tire 1.

Figure 2:
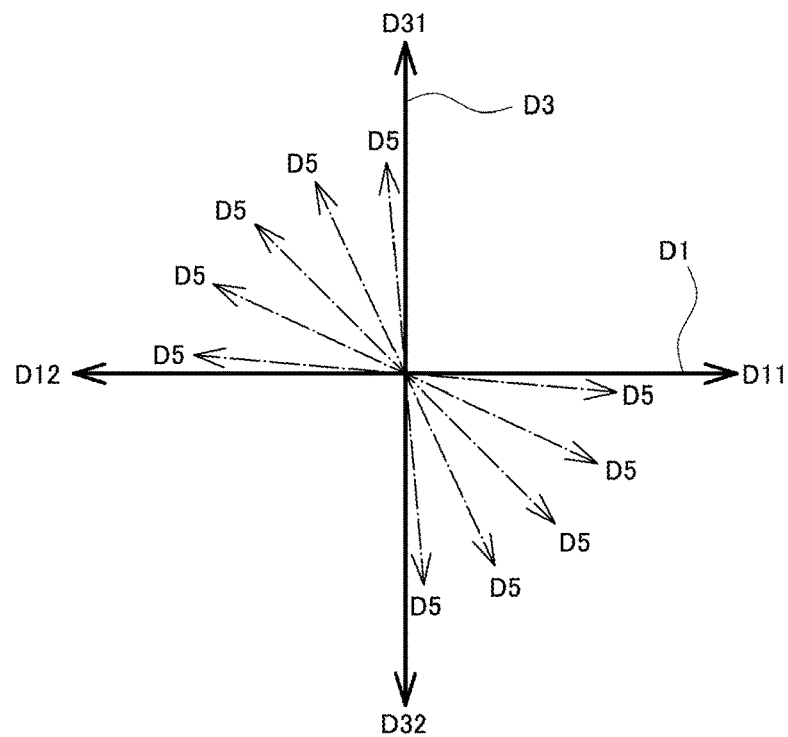
FIG. 2 is a drawing for explaining a second inclined direction.

Note, as shown in FIG. 1, that the direction D4 which is inclined so as to be increasingly directed toward first circumferential direction D31 as one proceeds toward first axial direction D11 (the direction which is inclined so as to be increasingly directed toward second circumferential direction D32 as one proceeds toward second axial direction D12) will be referred to as first inclined direction D4. Furthermore, as shown in FIG. 2, the direction D5 which is inclined so as to be increasingly directed toward second circumferential direction D32 as one proceeds toward first axial direction D11 (the direction which is inclined so as to be increasingly directed toward first circumferential direction D31 as one proceeds toward second axial direction D12) will be referred to as second inclined direction D5.

In addition, where it is said that the direction in which something is inclined with respect to tire circumferential direction D3 (tire axial direction D1) is the same as the direction in which something else is inclined with respect thereto, this means that the two are inclined in the same direction with respect thereto (e.g., when the two are mutually in first inclined directions D4, D4 or the two are mutually in second inclined directions D5, D5). That is, where it is said that the direction in which something is inclined with respect to tire circumferential direction D3 (tire axial direction D1) is the same as the direction in which something else is inclined with respect thereto, this should be understood to include the situation in which the two are inclined in the same direction D4, D4 (D5, D5) notwithstanding the fact that the angles of inclination thereof with respect to tire circumferential direction D3 (tire axial direction D1) may be different.

Furthermore, where it is said that the direction in which something is inclined with respect to tire circumferential direction D3 (tire axial direction D1) is opposite the direction in which something else is inclined with respect thereto, this means that the two are inclined in opposite directions (first inclined direction D4 and second inclined direction D5). That is, where it is said that the direction in which something is inclined with respect to tire circumferential direction D3 (tire axial direction D1) is opposite the direction in which something else is inclined with respect thereto, this should be understood to include the situation in which the two are inclined in opposite directions D4, D5 notwithstanding the fact that the angles of inclination thereof with respect to tire circumferential direction D3 (tire axial direction D1) may be the same.

Figure 3:
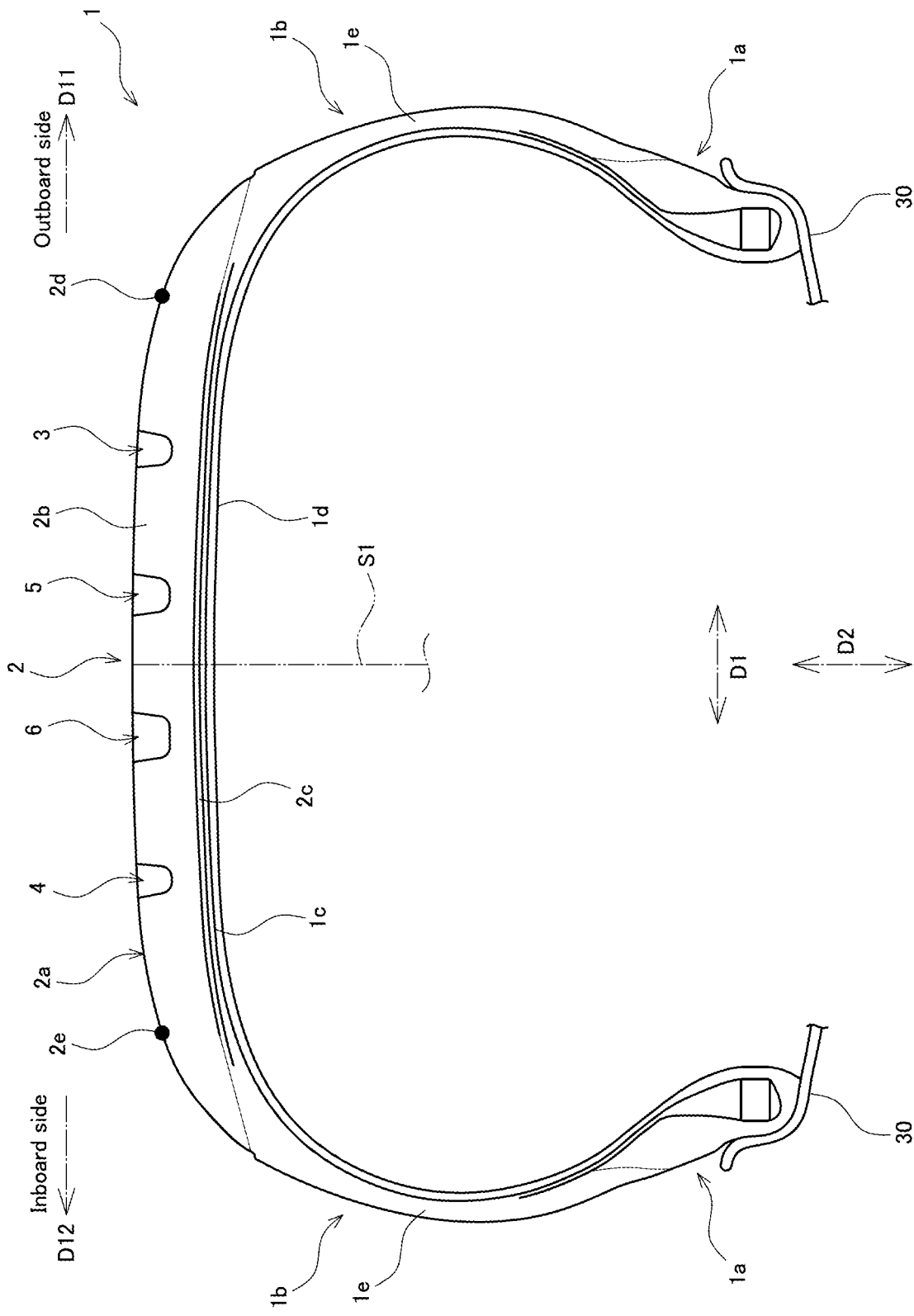
FIG. 3 is a view of a section, taken along a tire meridional plane, of the principal components in a pneumatic tire associated with an embodiment.

As shown in FIG. 3, tire 1 associated with the present embodiment comprises a pair of beads 1a at which bead cores are present; sidewalls 1b which extend outwardly in the tire radial direction D2 from the respective beads 1a; and tread 2, the exterior surface (tread surface 2a) in the tire radial direction D2 of which contacts the road surface and which is contiguous with the outer ends in the tire radial direction D2 of the pair of sidewalls 1b. In accordance with the present embodiment, tire 1 is a pneumatic tire 1, the interior of which is capable of being filled with air, and which is capable of being mounted on a rim 30.

Furthermore, tire 1 comprises carcass 1c which spans the pair of bead cores, and inner liner 1d which is arranged at a location toward the interior from carcass 1c and which has superior functionality in terms of its ability to impede passage of gas therethrough so as to permit air pressure to be maintained. Carcass 1c and inner liner 1d are arranged in parallel fashion with respect to the inner circumference of the tire over a portion thereof that encompasses beads 1a, sidewalls 1b, and tread 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire should be made to face the vehicle when tire 1 mounted on rim 30. Moreover, the tread pattern formed at tread surface 2a of tread 2 is shaped in asymmetric fashion with respect to tire equatorial plane S1.

For example, the orientation in which the tire is to be mounted on the vehicle may be indicated at sidewall 1b. More specifically, a constitution may be adopted in which sidewall 1b is provided with sidewall rubber 1e which is arranged toward the exterior in the tire axial direction D1 from carcass 1c so as to constitute the tire exterior surface, said sidewall rubber 1e having at the surface thereof an indicator region (not shown) that indicates an orientation in which the tire is to be mounted on the vehicle.

For example, one sidewall 1b, i.e., that which is to be arranged toward the interior when the tire is mounted on the vehicle (hereinafter also referred to as the "inboard side"), might be marked (e.g., with the word "INSIDE" or the like) so as to contain an indication to the effect that it is for the inboard side. Furthermore, for example, the other sidewall 1b, i.e., that which is to be arranged toward the exterior when the tire is mounted on the vehicle (hereinafter also referred to as the "outboard side"), might be marked (e.g., with the word "OUTSIDE" or the like) so as to contain an indication to the effect that it is for the outboard side. While there is no particular limitation with respect thereto, the side toward first axial direction D11 might, e.g., as is the case in the present embodiment, be taken to be the outboard side, and the side toward second axial direction D12 might be taken to be the inboard side.

Tread 2 is provided with tread rubber 2b having tread surface 2a which contacts the road surface, and belt 2c which is arranged between tread rubber 2b and carcass 1c. In addition, present at tread surface 2a is the contact patch that actually comes in contact with the road surface, the portions within said contact patch that are present at the outer ends in the tire axial direction D1 being referred to as contact patch ends 2d, 2e. Note that said contact patch refers to the tread surface 2a that comes in contact with the road surface when a normal load is applied to a tire 1 mounted on a normal rim 30 when the tire 1 is inflated to normal internal pressure and is placed in vertical orientation on a flat road surface.

Normal load is that load which is specified for use with a particular tire 1 in the context of the body of standards that contains the standard that applies to the tire 1 in question, this being "maximum load capacity" in the case of JATMA, the maximum value listed at the aforementioned table in the case of TRA, or "load capacity" in the case of ETRTO, which when tire 1 is to be used on a passenger vehicle is taken to be 85% of the load corresponding to an internal pressure of 180 kPa.

Figure 4:
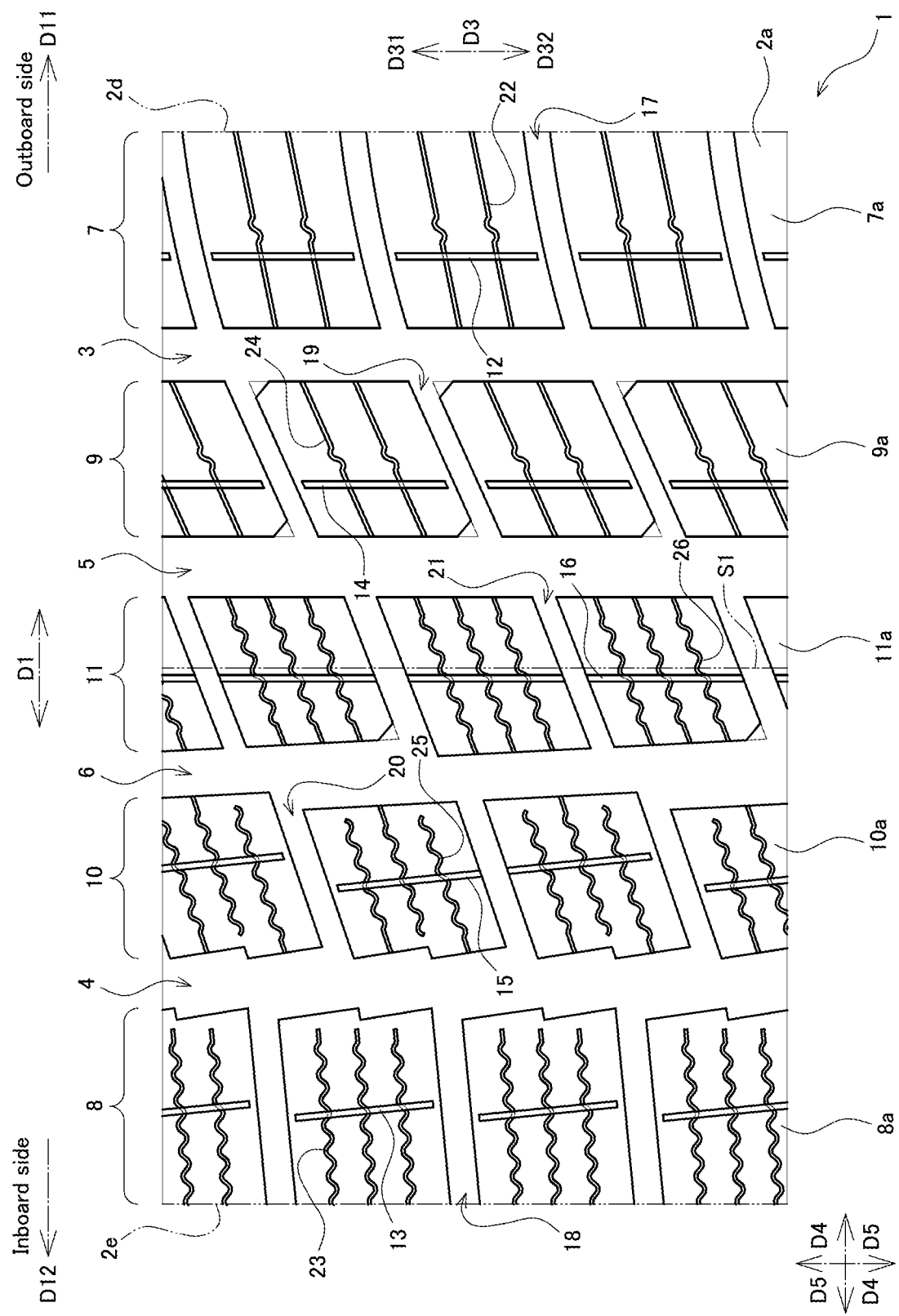
FIG. 4 is a drawing showing the principal components at the tread surface of a pneumatic tire associated with same embodiment as they would exist if unwrapped so as to lie in a single plane.

As shown in FIG. 3 and FIG. 4, tread rubber 2b comprises a plurality of main grooves 3, 4, 5, 6 that extend in the tire circumferential direction D3, and a plurality of lands 7, 8, 9, 10, 11 which are partitioned by the plurality of main grooves 3, 4, 5, 6 and a pair of contact patch ends 2d, 2e. While there is no particular limitation with respect thereto, the number of main grooves 3, 4, 5, 6 that are present might, e.g., as is the case in the present embodiment, be four, and the number of lands 7, 8, 9, 10, 11 that are present might be five.

Main grooves 3, 4, 5, 6 extend continuously in the tire circumferential direction D3. Main grooves 3, 4, 5, 6 might, for example, be provided with so-called tread wear indicators (not shown) which are portions at which depth of the groove is reduced so as to make it possible to ascertain the extent to which wear has occurred as a result of the exposure thereof that takes place in accompaniment to wear. Furthermore, main grooves 3, 4, 5, 6 might, for example, have groove widths that are each not less than 3% of the distance (dimension in the tire axial direction D1) between contact patch ends 2d, 2e. Furthermore, main grooves 3, 4, 5, 6 might, for example, have groove widths that are each not less than 5 mm.

The pair of main grooves 3, 4 arranged in outermost fashion in the tire axial direction D1 are referred to as shoulder main grooves 3, 4. Of the shoulder main grooves 3, 4, that main groove 3 which is arranged on the side in the first axial direction D11 (the outboard side) is referred to as first shoulder main groove 3, and that main groove 4 which is arranged on the side in the second axial direction D12 (the inboard side) is referred to as second shoulder main groove 4.

Furthermore, the main grooves 5, 6 arranged between the pair of shoulder main grooves 3, 4 are referred to as center main grooves 5, 6. Of the center main grooves 5, 6, that main groove 5 which is arranged on the side in the first axial direction D11 (the outboard side) is referred to as first center main groove 5, and that main groove 6 which is arranged on the side in the second axial direction D12 (the inboard side) is referred to as second center main groove 6.

Lands 7, 8 which are partitioned by a contact patch end 2d, 2e and a shoulder main groove 3, 4 are referred to as shoulder lands 7, 8; lands 9, 10, 11 which are partitioned by a pair of adjacent main grooves 3, 4, 5, 6 are referred to as middle lands 9, 10, 11. Note that middle lands 9, 10 which are partitioned by a center main groove 5, 6 and a shoulder main groove 3, 4 are also referred to as mediate lands 9, 10; middle land 11 which is partitioned by the pair of center main grooves 5, 6 is also referred to as center land 11.

Of the shoulder lands 7, 8, that land 7 which is arranged on the side in the first axial direction D11 (the outboard side) is referred to as first shoulder land 7, and that land 8 which is arranged on the side in the second axial direction D12 (the inboard side) is referred to as second shoulder land 8. Furthermore, of the mediate lands 9, 10, that land 9 which is arranged on the side in the first axial direction D11 (the outboard side) is referred to as first mediate land 9, and that land 10 which is arranged on the side in the second axial direction D12 (the inboard side) is referred to as second mediate land 10.

While there is no particular limitation with respect thereto, main grooves 3, 4, 5, 6 may, e.g., as is the case in the present embodiment, comprise straight main grooves 3, 5 and zigzag main grooves 4, 6. Note that straight main grooves 3, 5 are main grooves 3, 5 at which end edges at tread surface 2a are respectively parallel to the tire circumferential direction D3; zigzag main grooves 4, 6 are main grooves 4, 6 at which end edges at tread surface 2a are respectively inclined with respect to the tire circumferential direction D3.

Lands 7, 8, 9, 10, 11 comprise a plurality of ancillary grooves 12, 13, . . . , 25, 26. Of ancillary grooves 12, 13, . . . , 25, 26, those ancillary grooves 12, 13, 14, 15, 16 which extend in the tire circumferential direction D3 are referred to as circumferential grooves 12, 13, 14, 15, 16; of ancillary grooves 12, 13, . . . , 25, 26, those ancillary grooves 17, 18, . . . , 25, 26 which extend in the tire axial direction D1 are referred to as axial grooves 17, 18, . . . , 25, 26.

In addition, of axial grooves 17, 18, . . . , 25, 26, those axial grooves 17, 18, 19, 20, 21 for which the groove width at tread surface 2a is not less than 1.6 mm are referred to as slits 17, 18, 19, 20, 21. Furthermore, of axial grooves 17, 18, . . . , 25, 26, those axial grooves 22, 23, 24, 25, 26 for which the groove width at tread surface 2a is less than 1.6 mm are referred to as sipes 22, 23, 24, 25, 26.

Note that the angles of inclination of circumferential grooves 12, 13, 14, 15, 16 with respect to the tire circumferential direction D3 are less than 45°, it being preferred, for example, that these be not greater than 30°. Furthermore, the angles of inclination of axial grooves 17, 18, . . . , 25, 26 with respect to tire axial direction D1 are not greater than 45°, it being preferred, for example, that these be not greater than 30°.

While there is no particular limitation with respect thereto, slits 17, 18, 19, 20, 21 may, e.g., as is the case in the present embodiment, all extend along the full length in the tire axial direction D1 of lands 7, 8, 9, 10, 11. That is, each of the two ends of each slit 17, 18, 19, 20, 21 may respectively be contiguous with a main groove 3, 4, 5, 6 or a contact patch end 2d, 2e. As a result, lands 7, 8, 9, 10, 11 comprise a plurality of blocks 7a, 8a, 9a, 10a, 11a which are partitioned by slits 17, 18, 19, 20, 21 so as to as to be arrayed in the tire circumferential direction D3.

While there is no particular limitation with respect thereto, note that the number of blocks 7a, 8a, 9a, 10a, 11a in the respective lands 7, 8, 9, 10, 11 may, e.g., as is the case in the present embodiment, be the same, and/or the number of slits 17, 18, 19, 20, 21 in the respective lands 7, 8, 9, 10, 11 may be the same. Furthermore, while there is no particular limitation with respect thereto, the groove widths of slits 17, 18, 19, 20, 21 may, e.g., as is the case in the present embodiment, be constant (here understood to mean not only the situation in which these are the same but to also include situations in which these are approximately the same such that there is a difference of ±5% therebetween) everywhere along the full lengths thereof.

Furthermore, while there is no particular limitation with respect thereto, blocks 7a, 8a, 9a, 10a, 11a may, e.g., as is the case in the present embodiment, each comprise one circumferential groove 12, 13, 14, 15, 16. Furthermore, while there is no particular limitation with respect thereto, groove widths of circumferential grooves 12, 13, 14, 15, 16 might for example be 0.5 mm to 3.0 mm, 1.0 mm to 2.0 mm being for example preferred.

Furthermore, while there is no particular limitation with respect thereto, it is preferred, for example, that lengths in the tire circumferential direction D3 of circumferential grooves 12, 13, 14, 15, 16 be not less than 67% (=2/3) of lengths in the tire circumferential direction D3 of blocks 7a, 8a, 9a, 10a, 11a, and it is more preferred that these be not less than 75% (=3/4) thereof. In addition, circumferential grooves 12, 13, 14, 15, 16 might, for example, extend in the tire circumferential direction D3 so as to intersect all sipes 22, 23, 24, 25, 26 of blocks 7a, 8a, 9a, 10a, 11a.

Here, the constitutions of sipes 22, 24 at lands 7, 9 which are arranged so that the entireties thereof are toward the outboard side (toward first axial direction D11) from tire equatorial plane S1, and of sipes 23, 25 at lands 8, 10 which are arranged so that the entireties thereof are toward the inboard side (toward second axial direction D12) from tire equatorial plane S1, will now be described with reference to FIG. 4.

As shown in FIG. 4, the number of sipes 23 at second shoulder land 8 might, for example, be greater than the number of sipes 22 at first shoulder land 7. In addition, total length of sipes 23 at second shoulder land 8 might, for example, be greater than total length of sipes 22 at first shoulder land 7.

Furthermore, the number of sipes 25 at second mediate land 10 may, e.g., as is the case in the present embodiment, be greater than the number of sipes 24 at first mediate land 9. In addition, total length of sipes 25 at second mediate land 10 might, for example, be greater than total length of sipes 24 at first mediate land 9.

Thus, at lands 8, 10 which are arranged so that the entireties thereof are toward second axial direction (toward the inboard side) D12 from tire equatorial plane S1, the fact that lengths of sipes 23, 25 are greater makes it possible to achieve increase in traction attributable to edges of sipes 23, 25 at lands 8, 10 toward second axial direction (toward the inboard side) D12. As a result, it will be possible to improve performance on snowy road surfaces.

Moreover, at lands 7, 9 which are arranged so that the entireties thereof are toward first axial direction D11 (toward the outboard side) from tire equatorial plane S1, the fact that lengths of sipes 22, 24 are suppressed from becoming too large makes it possible to suppress reduction in rigidity of lands 7, 9 toward first axial direction D11 (toward the outboard side). As a result, it will be possible to improve performance on dry road surfaces (especially performance with respect to stability in handling during turns).

Accordingly, it will be possible to achieve both performance on dry road surfaces as a result of ensuring rigidity and performance on snowy road surfaces as a result of provision of traction. As a result, while there is no particular limitation with respect thereto, tire 1 associated with the present embodiment is capable of being used as an all-season tire (a tire suitable for dry road surfaces and snowy road surfaces). Note that what are referred to as the lengths of sipes 22, 23, 24, 25, 26 (and the same is true of the lengths of respective portions 22c, 22d, 23c, 23d, . . . , 25c, 25d, 26c, 26d, described below) are the lengths along the midpoints of the groove widths of sipes 22, 23, 24, 25, 26.

Next, the constitutions of respective lands 7, 8, 9, 10, 11 will be described with reference to FIG. 5 through FIG. 9.

Figure 5:
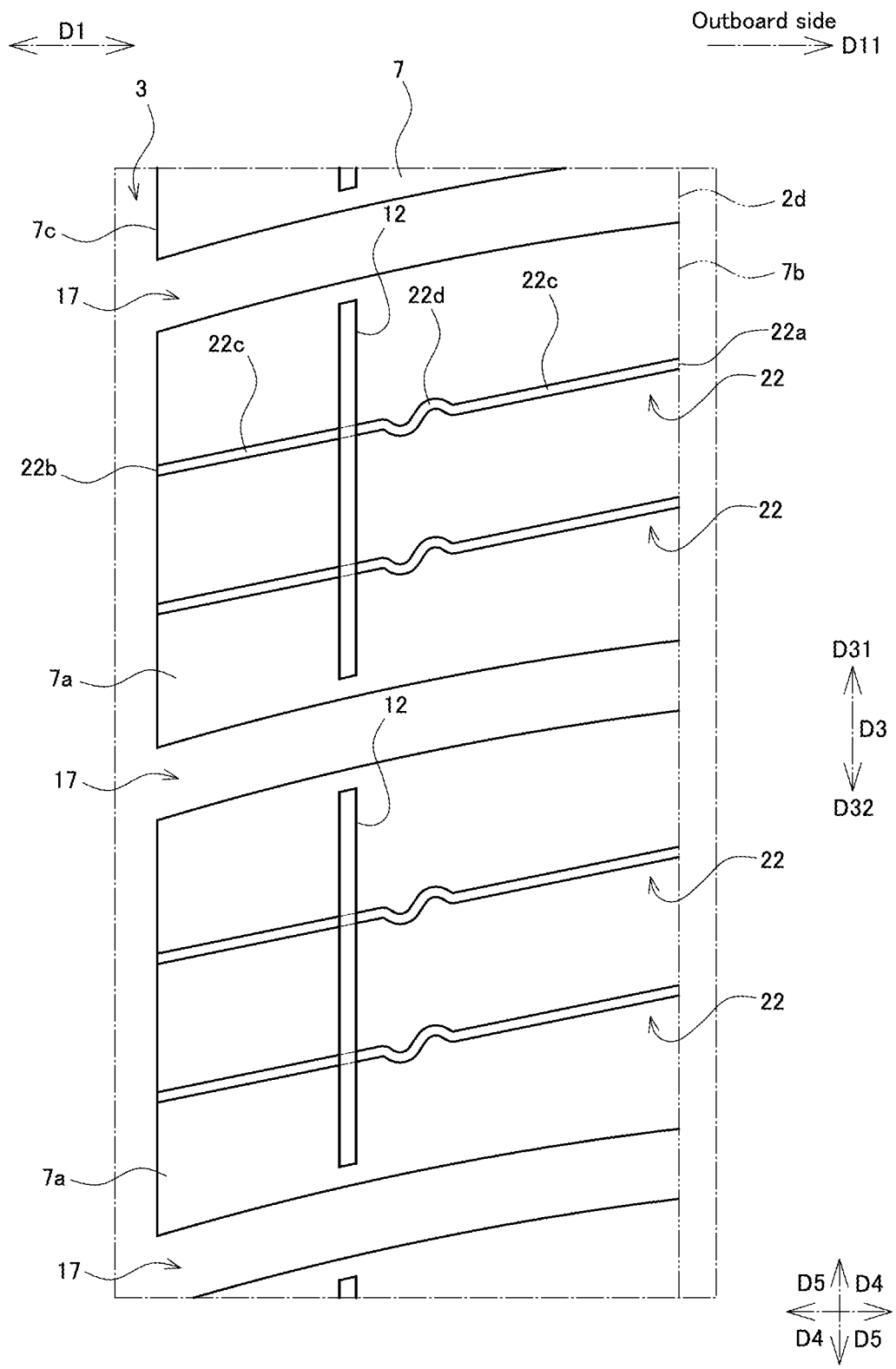
FIG. 5 is a drawing showing the principal components of a first shoulder land associated with same embodiment as they would exist if unwrapped so as to lie in a single plane.

The constitution of first shoulder land 7 will first be described with reference to FIG. 5.

For example, when the vehicle is braking or when tire 1 is on an outside wheel when the vehicle is making a turn, there is a tendency for a large force to act at first shoulder land 7. To address this, as shown in FIG. 5, circumferential groove (sometimes referred to as "first shoulder circumferential groove") 12 at first shoulder land 7 is respectively separated from the pair of slits (sometimes referred to as "first shoulder slits") 17, 17 which partition block (sometimes referred to as "first shoulder block") 7a.

As a result, because it is possible to suppress reduction in rigidity of end portions in the tire circumferential direction D3 of block 7a, it will be possible to suppress reduction in rigidity of block 7a. Accordingly, it will, for example, be possible to improve performance on dry road surfaces (especially performance with respect to braking and performance with respect to stability in handling during turns).

Moreover, while there is no particular limitation with respect thereto, a constitution may be adopted in which, e.g., as is the case in the present embodiment, groove width of circumferential groove 12 is greater than groove width of sipe 22 but is less than groove width of slit 17. Furthermore, while there is no particular limitation with respect thereto, circumferential groove 12 (specifically, the midpoint of the groove width) may, e.g., as is the case in the present embodiment, extend so as to be parallel (here understood to mean not only the situation in which these are perfectly parallel but to also include situations in which these are approximately parallel such that there is less than ±1° of inclination therebetween) to the tire circumferential direction D3.

Furthermore, a constitution may be adopted in which, for example, first end (the outer end in the tire axial direction D1) 22a of sipe 22 is contiguous with outer end 7b in the tire axial direction D1 of first shoulder land 7, and second end (the inner end in the tire axial direction D1) 22b of sipe 22 is contiguous with inner end 7c in the tire axial direction D1 of first shoulder land 7. That is, a constitution may be adopted in which first end 22a of sipe 22 is contiguous with first contact patch end 2d, and second end 22b of sipe 22 is contiguous with first shoulder main groove 3.

Furthermore, sipe 22 may, for example, comprise straight portion(s) 22c which extend in straight fashion, and zigzag portion(s) 22d which extend in zigzag fashion. In addition, circumferential groove 12 may, e.g., as is the case in the present embodiment, intersect straight portion 22c of sipe 22. Moreover, at sipe 22 in first shoulder land 7, length of straight portion 22c may, e.g., as is the case in the present embodiment, be greater than length of zigzag portion 22d.

Furthermore, a constitution may be adopted in which, e.g., as is the case in the present embodiment, a pair of straight portions 22c are arranged at either end in the tire axial direction D1 of sipe 22, and zigzag portion 22d is arranged between the pair of straight portions 22c, 22c. Furthermore, sipes 22 and slits 17 of first shoulder land 7 may, e.g., as is the case in the present embodiment, be inclined in the same direction (first inclined direction) D4 with respect to the tire axial direction D1.

Figure 6:
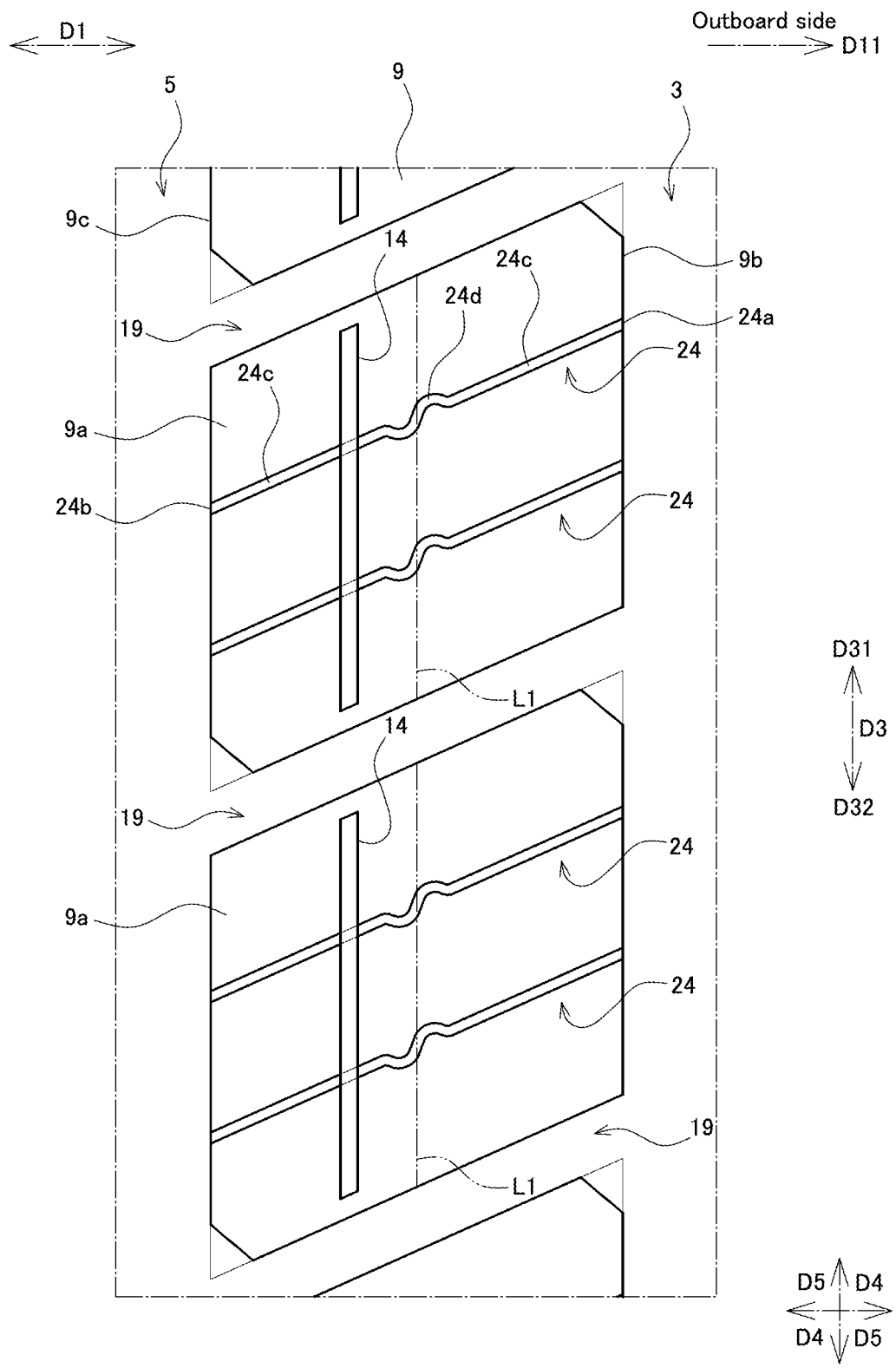
FIG. 6 is a drawing showing the principal components of a first mediate land associated with same embodiment as they would exist if unwrapped so as to lie in a single plane.

Next, the constitution of first mediate land 9 will be described with reference to FIG. 6.

For example, when tire 1 is on an outside wheel when the vehicle is making a turn, there is a tendency for a somewhat large force to also act at first mediate land 9. To address this, as shown in FIG. 6, circumferential groove (sometimes referred to as "first mediate circumferential groove") 14 at first mediate land 9 is respectively separated from the pair of slits (sometimes referred to as "first mediate slits") 19, 19 which partition block (sometimes referred to as "first mediate block") 9a.

As a result, because it is possible to suppress reduction in rigidity of end portions in the tire circumferential direction D3 of block 9a, it will be possible to suppress reduction in rigidity of block 9a. Accordingly, it will, for example, be possible to improve performance on dry road surfaces (especially performance with respect to stability in handling during turns).

When tire 1 is on an outside wheel when the vehicle is making a turn, it so happens that, at block 9a in first mediate land 9, because contact patch pressure will be low in regions toward the interior in the tire axial direction D1, there is a tendency for traction attributable to edges in said regions toward the interior to be low. To address this, circumferential groove 14 is arranged toward the interior in the tire axial direction D1 from center L1 in the tire axial direction D1 of block 9a.

As a result, because this will make it possible to increase lengths of edges in regions toward the interior at blocks 9a, it will be possible to suppress situations from occurring in which traction would otherwise become low in regions toward the interior at blocks 9a, where contact patch pressure is low during turns on snowy road surfaces. Accordingly, it will be possible to suppress reduction in performance on snowy road surfaces (especially performance with respect to stability in handling during turns). Note that center L1 (and the same is true of center L2, described below) in the tire axial direction D1 of block 9a is the line which is parallel to the tire circumferential direction D3 and which passes through a location at the midpoint between the outwardmost end and inwardmost end in the tire axial direction D1 of block 9a.

Furthermore, while there is no particular limitation with respect thereto, a constitution may be adopted in which, e.g., as is the case in the present embodiment, groove width of circumferential groove 14 is greater than groove width of sipe 24 but is less than groove width of slit 19. Furthermore, while there is no particular limitation with respect thereto, circumferential groove 14 (specifically, the midpoint of the groove width) may, e.g., as is the case in the present embodiment, extend so as to be parallel (here understood to mean not only the situation in which these are perfectly parallel but to also include situations in which these are approximately parallel such that there is less than ±1° of inclination therebetween) to the tire circumferential direction D3.

Furthermore, a constitution may be adopted in which, for example, first end (the outer end in the tire axial direction D1) 24a of sipe 24 is contiguous with outer end 9b in the tire axial direction D1 of first mediate land 9, and second end (the inner end in the tire axial direction D1) 24b of sipe 24 is contiguous with inner end 9c in the tire axial direction D1 of first mediate land 9. That is, a constitution may be adopted in which first end 24a of sipe is contiguous with first shoulder main groove 3, and second end 24b of sipe 24 is contiguous with first center main groove 5.

Furthermore, sipe 24 may, for example, comprise straight portion(s) 24c which extend in straight fashion, and zigzag portion(s) 24d which extend in zigzag fashion. In addition, circumferential groove 14 may, e.g., as is the case in the present embodiment, intersect straight portion 24c of sipe 24. Moreover, at sipe 24 in first mediate land 9, length of straight portion 24c may, e.g., as is the case in the present embodiment, be greater than length of zigzag portion 24d.

Furthermore, a constitution may be adopted in which, e.g., as is the case in the present embodiment, a pair of straight portions 24c are arranged at either end in the tire axial direction D1 of sipe 24, and zigzag portion 24d is arranged between the pair of straight portions 24c, 24c. Furthermore, sipes 24 and slits 19 of first mediate land 9 may, e.g., as is the case in the present embodiment, be inclined in the same direction (first inclined direction) D4 with respect to the tire axial direction D1.

Figure 7:
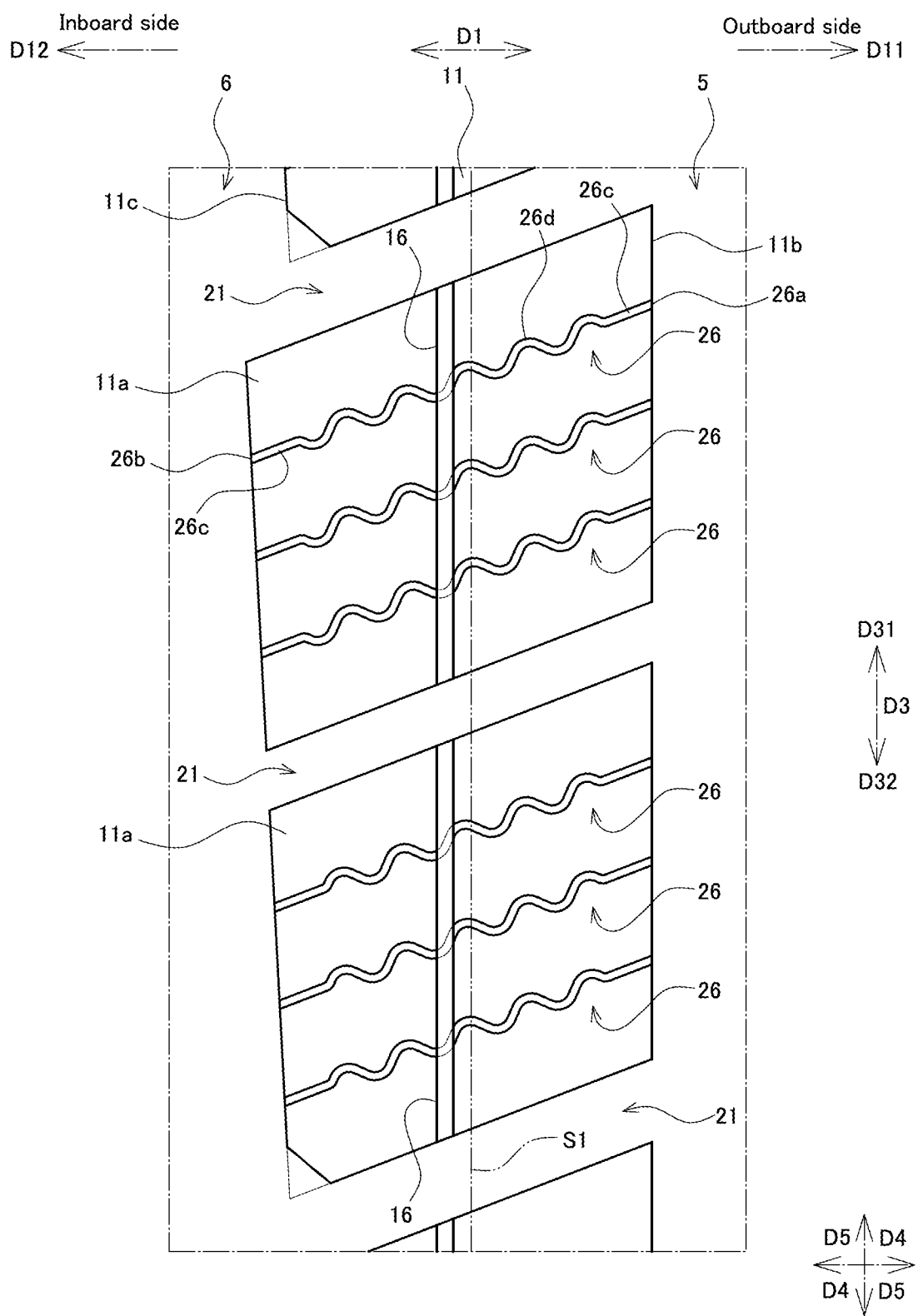
FIG. 7 is a drawing showing the principal components of a center land associated with same embodiment as they would exist if unwrapped so as to lie in a single plane.

Next, the constitution of center land 11 will be described with reference to FIG. 7.

For example, when the vehicle is going straight ahead, contact patch length (length in the tire circumferential direction D3) in regions toward the interior in the tire axial direction D1, particularly at center land 11, might increase. As a result, many circumferential grooves (sometimes referred to as "center circumferential grooves") 16 at center land 11 will come in contact with the ground.

To address this, circumferential groove 16 at center land 11 is respectively contiguous with the pair of slits (sometimes referred to as "center slits") 21, 21 which partition block (sometimes referred to as "center block") 11a. As a result, because this will make it possible for circumferential grooves 16 at center land 11, a large number of which come in contact with the ground, to increase in length, this will make it possible to increase traction attributable to edges of circumferential grooves 16 when on a snowy road surface. Accordingly, it will be possible to improve performance on snowy road surfaces (especially performance with respect to stability in handling as a result of prevention of lateral sliding).

Moreover, while there is no particular limitation with respect thereto, a constitution may be adopted in which, e.g., as is the case in the present embodiment, groove width of circumferential groove 16 is greater than groove width of sipe 26 but is less than groove width of slit 21. Furthermore, while there is no particular limitation with respect thereto, circumferential groove 16 (specifically, the midpoint of the groove width) may, e.g., as is the case in the present embodiment, extend so as to be parallel (here understood to mean not only the situation in which these are perfectly parallel but to also include situations in which these are approximately parallel such that there is less than ±1° of inclination therebetween) to the tire circumferential direction D3.

Furthermore, for example, first end 26a of sipe 26 may be contiguous with first end 11b in the tire axial direction D1 of center land 11, and second end 26b of sipe 26 may be contiguous with second end 11c in the tire axial direction D1 of center land 11. That is, first end 26a of sipe 26 may be contiguous with first center main groove 5, and second end 26b of sipe 26 may be contiguous with second center main groove 6.

Furthermore, sipe 26 may, for example, comprise straight portion(s) 26c which extend in straight fashion, and zigzag portion(s) 26d which extend in zigzag fashion. In addition, circumferential groove 16 may, e.g., as is the case in the present embodiment, intersect zigzag portion 26d of sipe 26. Moreover, at sipe 26 in center land 11, length of zigzag portion 26d may, e.g., as is the case in the present embodiment, be greater than length of straight portion 26c.

Furthermore, a constitution may be adopted in which, e.g., as is the case in the present embodiment, a pair of straight portions 26c are arranged at either end in the tire axial direction D1 of sipe 26, and zigzag portion 26d is arranged between the pair of straight portions 26c, 26c. Furthermore, sipes 26 and slits 21 of center land 11 may, e.g., as is the case in the present embodiment, be inclined in the same direction (first inclined direction) D4 with respect to the tire axial direction D1.

Next, the constitution of second mediate land 10 will be described with reference to FIG. 8.

Figure 8:
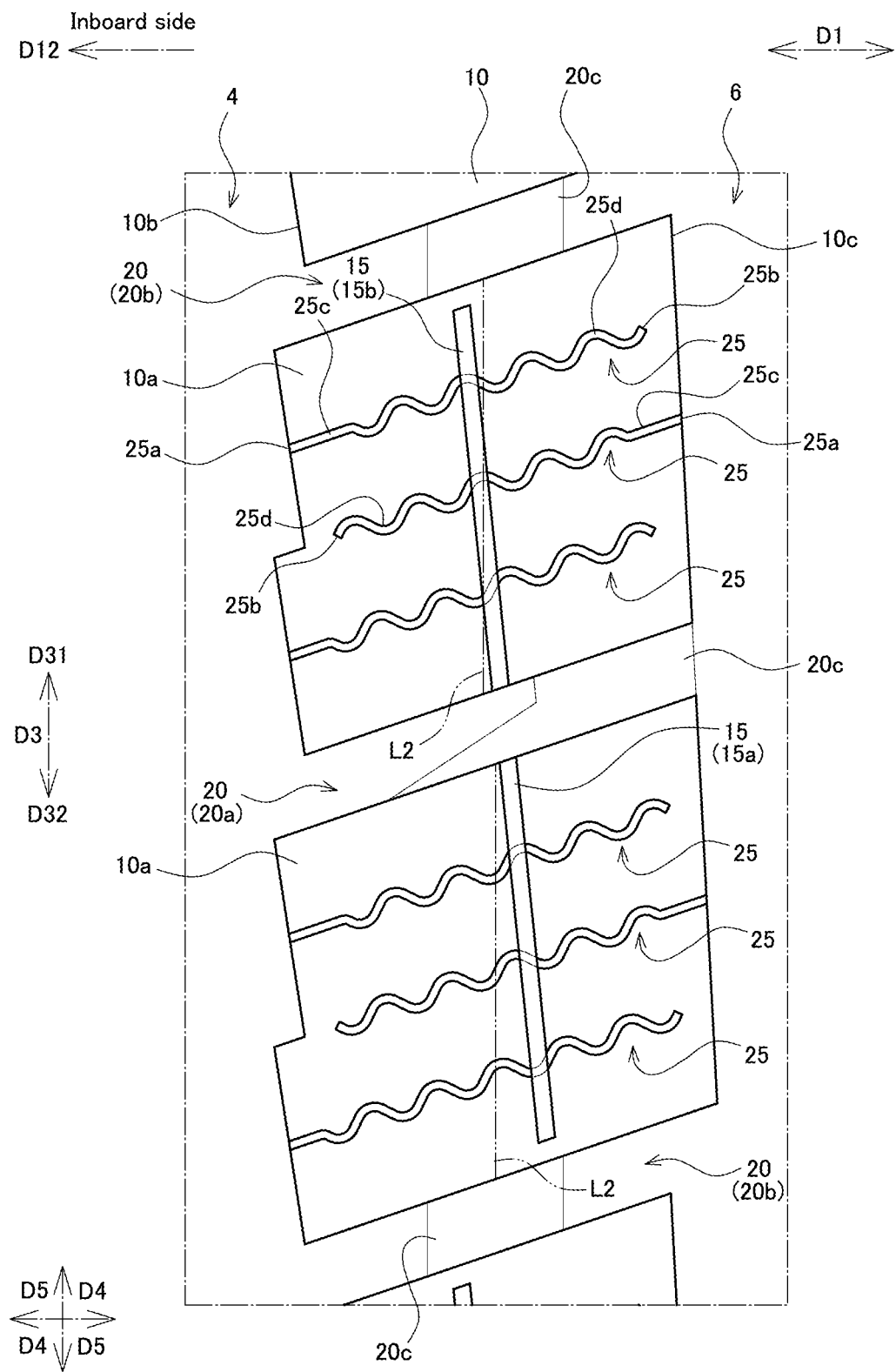
FIG. 8 is a drawing showing the principal components of a second mediate land associated with same embodiment as they would exist if unwrapped so as to lie in a single plane.

As shown in FIG. 8, circumferential groove (sometimes referred to as "second mediate circumferential groove") 15 at second mediate land 10 is contiguous with one slit (sometimes referred to as "first adjacent slit") 20a of the pair of slits (sometimes referred to as "second mediate slits") 20a, 20b which partition block (sometimes referred to as "second mediate block") 10a. This makes it possible to ensure that circumferential groove 15 has adequate length.

Furthermore, circumferential groove 15 at second mediate land 10 is separated from the other slit (sometimes referred to as "second adjacent slit") 20b of the pair of slits 20a, 20b. This makes it possible to suppress reduction in rigidity at one end portion in the tire circumferential direction D3 of block 10a.

Accordingly, because it will be possible to ensure that there is adequate traction attributable to edges of circumferential grooves 15 when on snowy road surfaces, it will be possible to ensure that there is adequate performance on snowy road surfaces (especially performance with respect to stability in handling as a result of prevention of lateral sliding), and to moreover suppress reduction in rigidity at blocks 10a. Thus, at second mediate land 10, it will be possible, for example, to achieve both performance on dry road surfaces as a result of ensuring good rigidity and performance on snowy road surfaces as a result of provision of traction.

While there is no particular limitation with respect thereto, note, for example, that depth (e.g., average groove depth) of one slit (first adjacent slit) 20a may be less than depth (e.g., average groove depth) of the other slit (second adjacent slit) 20b. That is, the pair of slits 20a, 20b may comprise shallow-groove slit 20a which is contiguous with circumferential groove 15, and deep-groove slit 20b which is separated from circumferential groove 15 and which has a groove depth that is greater than the groove depth of shallow-groove slit 20a.

Moreover, slits 20 which are arrayed in the tire circumferential direction D3 may, e.g., as is the case in the present embodiment, be such that shallow-groove slits 20a and deep-groove slits 20b are arranged in alternating fashion in the tire circumferential direction D3. Furthermore, reduction of groove depth may, e.g., as is the case in the present embodiment, be accomplished by causing slits 20a, 20b to comprise projections 20c which protrude outwardly in the tire radial direction D2 from the groove base.

Furthermore, while there is no particular limitation with respect thereto, a constitution may be adopted in which, e.g., as is the case in the present embodiment, groove width of circumferential groove 15 is greater than groove width of sipe 25 but is less than groove width of slit 20. Furthermore, some circumferential groove(s) 15a among the plurality of grooves 15a, 15b at second mediate land 10 may, e.g., as is the case in the present embodiment, be arranged toward the interior in the tire axial direction D1 from center L2 in the tire axial direction D1 of block 9a.

That is, a constitution may be adopted in which circumferential grooves 15 at second mediate land 10 comprise inward circumferential groove(s) 15a which are arranged toward the interior in the tire axial direction D1 from center L2 in the tire axial direction D1 of block 9a, and central circumferential groove(s) 15b which are arranged so as to intersect center L2 in the tire axial direction D1 of block 9a. Moreover, circumferential grooves 15 which are arrayed in the tire circumferential direction D3 may, e.g., as is the case in the present embodiment, be such that inward circumferential grooves 15a and central circumferential grooves 15b are arranged in alternating fashion in the tire circumferential direction D3.

Furthermore, circumferential grooves 15 (specifically, the groove width midpoints thereof) extend so as to be inclined with respect to the tire circumferential direction D3. As a result, because it is possible to increase the lengths of circumferential grooves 15 at second mediate land 10, this will make it possible to increase traction attributable to edges of circumferential grooves 15 when on a snowy road surface. Accordingly, it will be possible to improve performance on snowy road surfaces (especially performance with respect to stability in handling as a result of prevention of lateral sliding).

While there is no particular limitation with respect thereto, it is preferred that the angle of inclination of circumferential groove 15 with respect to the tire circumferential direction D3 be, for example, not less than 1°, and it is preferred that this be, for example, not greater than 10°. Furthermore, circumferential grooves 15 and slits 20 may, e.g., as is the case in the present embodiment, be inclined in mutually opposite directions D5, D4 with respect to the tire circumferential direction D3. More specifically, in accordance with the present embodiment, circumferential groove 15 extends so as to be inclined in second inclined direction D5, and slit 20 extends so as to be inclined in first inclined direction D4.

Furthermore, it is also possible, for example, to adopt a constitution in which first ends 25a of sipes 25 are contiguous with side ends 10b, 10c in the tire axial direction D1 of second mediate land 10, and second ends 25b of sipes 25 are separated from side ends 10b, 10c in the tire axial direction D1 of second mediate land 10. That is, a constitution may be adopted in which first ends 25a of sipes 25 are contiguous with main grooves 4, 6, and second ends 25b of sipes 25 are separated from main grooves 4, 6.

Furthermore, sipe 25 may, for example, comprise straight portion(s) 25c which extend in straight fashion, and zigzag portion(s) 25d which extend in zigzag fashion. In addition, circumferential groove 15 may, e.g., as is the case in the present embodiment, intersect zigzag portion 25d of sipe 25. Moreover, at sipe 25 in second mediate land 10, length of zigzag portion 25d may, e.g., as is the case in the present embodiment, be greater than length of straight portion 25c.

Furthermore, a constitution may be adopted in which, e.g., as is the case in the present embodiment, straight portion 25c is arranged toward first end 25a at sipe 25, and zigzag portion 25d is arranged toward second end 25b at sipe 25. Furthermore, sipes 25 and slits 20 of second mediate land 10 may, e.g., as is the case in the present embodiment, be inclined in the same direction (first inclined direction) D4 with respect to the tire axial direction D1.

Figure 9:
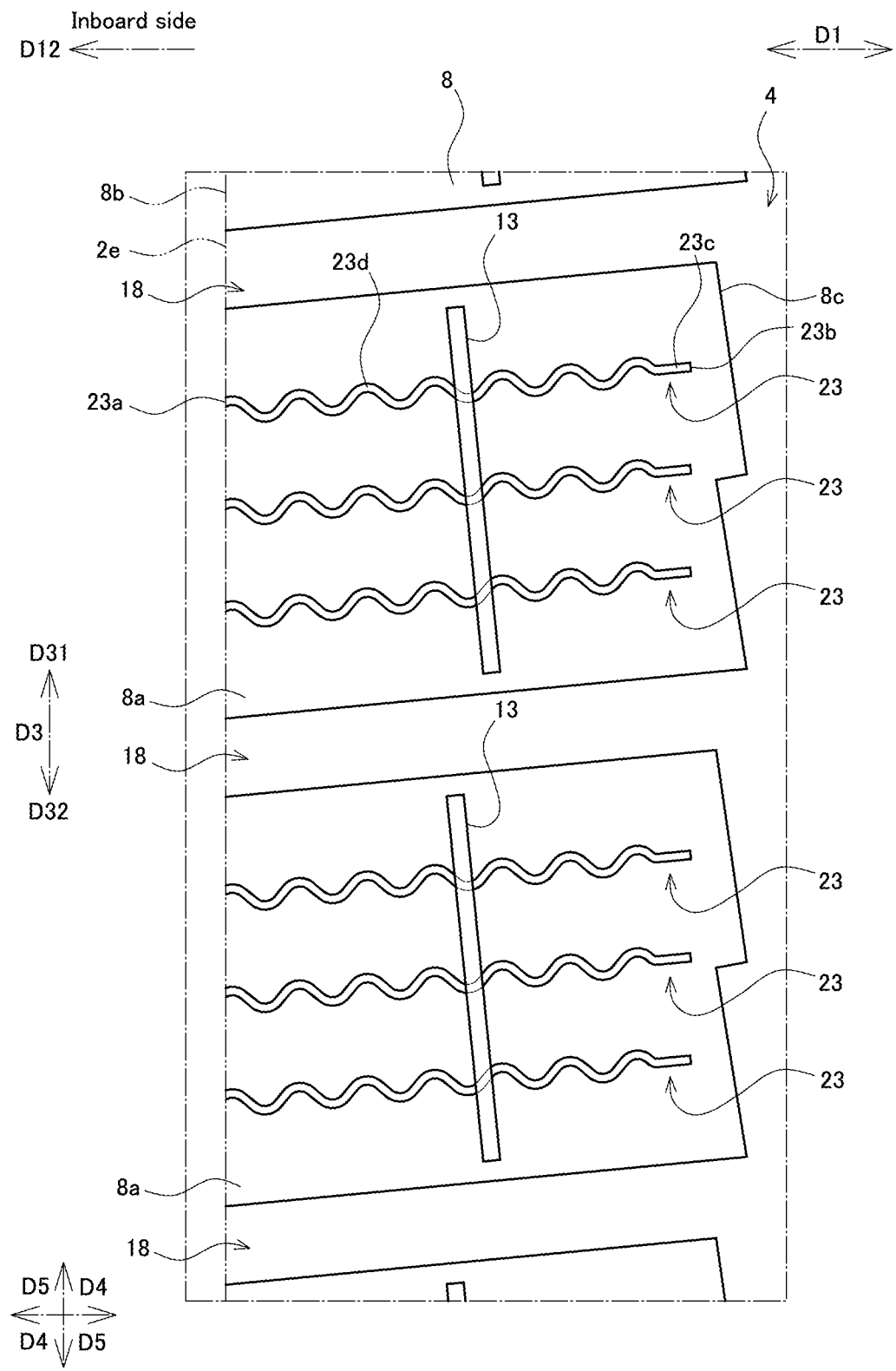
FIG. 9 is a drawing showing the principal components of a second shoulder land associated with same embodiment as they would exist if unwrapped so as to lie in a single plane.

Next, the constitution of second shoulder land 8 will be described with reference to FIG. 9.

For example, when the vehicle is braking, there is a tendency for a large force to act at second shoulder land 8. To address this, as shown in FIG. 9, circumferential groove (sometimes referred to as "second shoulder circumferential groove") 13 at second shoulder land 8 might, for example, be respectively separated from the pair of slits (sometimes referred to as "second shoulder slits") 18, 18 which partition block (sometimes referred to as "second shoulder block") 8a.

As a result, because it is possible to suppress reduction in rigidity of end portions in the tire circumferential direction D3 of block 8a, it will be possible to suppress reduction in rigidity of block 8a. Accordingly, it will, for example, be possible to improve performance on dry road surfaces (especially performance with respect to braking). Moreover, while there is no particular limitation with respect thereto, a constitution may be adopted in which, e.g., as is the case in the present embodiment, groove width of circumferential groove 13 is greater than groove width of sipe 23 but is less than groove width of slit 18.

Furthermore, circumferential grooves 13 (specifically, the groove width midpoints thereof) extend so as to be inclined with respect to the tire circumferential direction D3. As a result, because it is possible to increase the lengths of circumferential grooves 13 at second shoulder land 8, this will make it possible to increase traction attributable to edges of circumferential grooves 13 when on a snowy road surface. Accordingly, it will be possible to improve performance on snowy road surfaces (especially performance with respect to stability in handling as a result of prevention of lateral sliding).

While there is no particular limitation with respect thereto, it is preferred that the angle of inclination of circumferential groove 13 with respect to the tire circumferential direction D3 be, for example, not less than 1°, and it is preferred that this be, for example, not greater than 10°. Furthermore, circumferential grooves 13 and slits 18 may, e.g., as is the case in the present embodiment, be inclined in mutually opposite directions D5, D4 with respect to the tire circumferential direction D3. More specifically, in accordance with the present embodiment, circumferential groove 13 extends so as to be inclined in second inclined direction D5, and slit 18 extends so as to be inclined in first inclined direction D4.

Furthermore, a constitution may be adopted in which, e.g., as is the case in the present embodiment, first end (the outer end in the tire axial direction D1) 23a of sipe is contiguous with outer end 8b in the tire axial direction D1 of second shoulder land 8, and second end (the inner end in the tire axial direction D1) 23b of sipe 23 is separated from inner end 8c in the tire axial direction D1 of second shoulder land 8. That is, a constitution may be adopted in which first end 23a of sipe 23 is contiguous with second contact patch end 2e, and second end 23b of sipe 23 is separated from second shoulder main groove 4.

Furthermore, sipe 23 may, for example, comprise straight portion(s) 23c which extend in straight fashion, and zigzag portion(s) 23d which extend in zigzag fashion. In addition, circumferential groove 13 may, e.g., as is the case in the present embodiment, intersect zigzag portion 23d of sipe 23. Moreover, at sipe 23 in second shoulder land 8, length of zigzag portion 23d may, e.g., as is the case in the present embodiment, be greater than length of straight portion 23c.

Furthermore, a constitution may be adopted in which, e.g., as is the case in the present embodiment, straight portion 23c is arranged toward the interior in the tire axial direction D1 of sipe 23, and zigzag portion 23d is arranged toward the exterior in the tire axial direction D1 of sipe 23. Furthermore, sipes 23 and slits 18 of second shoulder land 8 may, e.g., as is the case in the present embodiment, be inclined in the same direction (first inclined direction) D4 with respect to the tire axial direction D1.

Moreover as shown in FIG. 5 through FIG. 9, slits 17, 18, 19, 20, 21 of respective lands 7, 8, 9, 10, 11 may, e.g., as is the case in the present embodiment, be inclined in the same direction (first inclined direction) D4 with respect to the tire axial direction D1. Furthermore, sipes 22, 23, 24, 25, 26 of respective lands 7, 8, 9, 10, 11 may, e.g., as is the case in the present embodiment, be inclined in the same direction (first inclined direction) D4 with respect to the tire axial direction D1.

As described above, as in the present embodiment, it is preferred that
the pneumatic tire 1 includes a plurality of main grooves 3, 4, 5, 6 extending in a tire circumferential direction D3, and a plurality of lands 7, 8, 9, 10, 11 which are partitioned by the plurality of main grooves 3, 4, 5, 6 and a pair of contact patch ends 2d, 2e, wherein:
the plurality of lands 7, 8, 9, 10, 11 comprise first and second shoulder lands 7, 8 which are arranged so as to be outwardmost in a tire axial direction D1, and a center land 11 which is arranged nearest to a tire equatorial plane S1;
the first shoulder land 7 comprises a plurality of first shoulder slits 17 which each extend across a full width of the first shoulder land 7 in the tire axial direction D1, and a first shoulder block 7a which is partitioned by a pair of first shoulder slits 17, 17 which among the plurality of first shoulder slits 17 are mutually adjacent in the tire circumferential direction D3;
the first shoulder block 7a comprises at least one first shoulder circumferential groove 12 which extends in the tire circumferential direction D3;
the at least one first shoulder circumferential groove 12 is respectively separated from the pair of first shoulder slits 17, 17;
the center land 11 comprises a plurality of center slits 21 which each extend across a full width of the center land 11 in the tire axial direction D1, and a center block 11a which is partitioned by a pair of center slits 21, 21 which among the plurality of center slits 21 are mutually adjacent in the tire circumferential direction D3;
the center block 11a comprises at least one center circumferential groove 16 which extends in the tire circumferential direction D3; and
the at least one center circumferential groove 16 is respectively contiguous with the pair of center slits 21, 21.

In accordance with such constitution, because first shoulder circumferential groove 12 is separated from pair of first shoulder slits 17, 17, it is possible to suppress reduction in rigidity at end portions in the tire circumferential direction D3 of first shoulder block 7a. As a result, it will be possible to suppress reduction in rigidity at first shoulder block 7a.

In addition, to address the fact that contact patch length in regions toward the interior in the tire axial direction D1 increases when the vehicle is going straight ahead, center circumferential groove 16 is respectively contiguous with pair of center slits 21, 21. As a result, because this will make it possible for center circumferential grooves 16, a large number of which come in contact with the ground, to increase in length, this will make it possible to increase traction attributable to edges of center circumferential grooves 16 when on a snowy road surface. It will therefore be possible to improve performance on snowy road surfaces while ensuring rigidity of blocks 7a.

Further, as in the present embodiment, it is preferred that the pneumatic tire 1 includes a configuration in which:

the plurality of lands 7, 8, 9, 10, 11 further comprise a first mediate land 9 which is arranged between the first shoulder land 7 and the center land 11;

the first mediate land 9 comprises a plurality of first mediate slits 19 which each extend across a full width of the first mediate land 9 in the tire axial direction D1, and a first mediate block 9a which is partitioned by a pair of first mediate slits 19, 19 which among the plurality of first mediate slits 19 are mutually adjacent in the tire circumferential direction D3;

the first mediate block 9a comprises at least one first mediate circumferential groove 14 which extends in the tire circumferential direction D3; and the at least one first mediate circumferential groove 14 is respectively separated from the pair of first mediate slits 19, 19.

In accordance with such constitution, because first mediate circumferential groove 14 is separated from pair of first mediate slits 19, 19, it is possible to suppress reduction in rigidity at end portions in the tire circumferential direction D3 of first mediate block 9a. As a result, this makes it possible to suppress reduction in rigidity at first mediate blocks 9a.

Further, as in the present embodiment, it is preferred that the pneumatic tire 1 includes a configuration in which:

the at least one first mediate circumferential groove 14 is arranged toward an interior in the tire axial direction D1 from a center L1 in the tire axial direction D1 of the first mediate block 9a.

In accordance with such constitution, to address the fact that contact patch pressure is low in regions toward the interior in the tire axial direction D1 of first mediate block 9a and there is a tendency for traction attributable to edges in said regions toward the interior to be low during turns, first mediate circumferential groove 14 is arranged toward the interior in the tire axial direction D1 from center L1 in the tire axial direction D1 of first mediate block 9a. As a result, because this will make it possible to increase lengths of edges in regions toward the interior at first mediate blocks 9a, it will be possible to suppress situations from occurring in which traction would otherwise become low in regions toward the interior at first mediate blocks 9a during turns on snowy road surfaces.

Further, as in the present embodiment, it is preferred that the pneumatic tire 1 includes a configuration in which:

the plurality of lands 7, 8, 9, 10, 11 further comprise a second mediate land 10 which is arranged between the second shoulder land 8 and the center land 11;

the second mediate land 10 comprises a plurality of second mediate slits 20 which each extend across a full width of the second mediate land 10 in the tire axial direction D1, and a second mediate block 10a which is partitioned by first and second adjacent slits 20a, 20b which among the plurality of second mediate slits 20 are mutually adjacent in the tire circumferential direction D3;

the second mediate block 10a comprises at least one second mediate circumferential groove 15 which extends in the tire circumferential direction D3; and the at least one second mediate circumferential groove 15 is contiguous with the first adjacent slit 20a but is separated from the second adjacent slit 20b.

In accordance with such constitution, because second mediate circumferential groove 15 is contiguous with first adjacent slit 20a, it is possible to ensure that second mediate circumferential groove 15 is of adequate length. As a result, because it will be possible to ensure that there is adequate traction attributable to edges of second mediate circumferential grooves 15 when on snowy road surfaces, it will be possible ensure that there will be good performance when on snowy road surfaces.

In addition, because second mediate circumferential groove 15 is separated from second adjacent slit 20b, it will be possible to suppress reduction in rigidity at one end portion in the tire circumferential direction D3 of second mediate block 10a. As a result, this will make it possible to suppress reduction in rigidity at second mediate blocks 10a.

Further, as in the present embodiment, it is preferred that the pneumatic tire 1 includes a configuration in which:

the at least one second mediate circumferential groove 15 extends so as to be inclined with respect to the tire circumferential direction D3.

In accordance with such constitution, because second mediate circumferential groove 15 extends so as to be inclined with respect to the tire circumferential direction D3, this makes it possible to increase the length of second mediate circumferential groove 15. As a result, because it will be possible to increase traction attributable to edges of second mediate circumferential grooves 15 when on snowy road surfaces, it will be possible improve performance on snowy road surfaces.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that first mediate circumferential groove 14 is respectively separated from pair of first mediate slits 19, 19. However, pneumatic tire 1 is not limited to such constitution. For example, it is also possible to adopt a constitution in which first mediate circumferential groove 14 is contiguous with at least one of the pair of first mediate slits 19, 19.

(2) Furthermore, the constitution of pneumatic tire 1 associated with the foregoing embodiment is such that first mediate circumferential groove 14 is arranged toward the interior in the tire axial direction D1 from center L1 in the tire axial direction D1 of first mediate block 9a. However, pneumatic tire 1 is not limited to such constitution.

For example, it is also possible to adopt a constitution in which first mediate circumferential groove is arranged toward the exterior in the tire axial direction D1 from center L1 in the tire axial direction D1 of first mediate block 9a. Furthermore, it is also possible, for example, to adopt a constitution in which first mediate circumferential groove 14 is arranged so as to intersect center L1 in the tire axial direction D1 of first mediate block 9a.

(3) Furthermore, the constitution of pneumatic tire 1 associated with the foregoing embodiment is such that second mediate circumferential groove 15 is contiguous with one of the pair of second mediate slits 20, 20 but is separated from the other. However, pneumatic tire 1 is not limited to such constitution. For example, it is also possible to adopt a constitution in which second mediate circumferential groove 15 is respectively contiguous with the pair of second mediate slits 20, 20, and it is also possible to adopt a constitution in which it is respectively separated from the pair of second mediate slits 20, 20.

(4) Furthermore, the constitution of pneumatic tire 1 associated with the foregoing embodiment is such that second mediate circumferential groove 15 extends so as to be inclined with respect to the tire circumferential direction D3. However, pneumatic tire 1 is not limited to such constitution. For example, it is also possible to adopt a constitution in which second mediate circumferential groove 15 extends so as to be parallel to the tire circumferential direction D3.

(5) Furthermore, the constitution of pneumatic tire 1 associated with the foregoing embodiment is such that there is one land 11 that intersects tire equatorial plane S1, that land being center land 11 which is arranged nearest to tire equatorial plane S1. However, pneumatic tire 1 is not limited to such constitution.

For example, it is also possible to adopt a constitution in which, for example, no land intersects tire equatorial plane S1; and it is also possible to adopt a constitution in which, for example, two lands intersect tire equatorial plane S1. Whereas such constitutions will comprise two center lands 11 that are arranged nearest to tire equatorial plane S1, it is sufficient that, of the first and second center lands 11 and the first and second shoulder lands 7, 8, that first center land 11 and that first shoulder land 7 which are arranged toward the first axial direction D11 have the prescribed constitution.

Note that what is meant by the prescribed constitution is a constitution in which at least one first shoulder circumferential groove 12 at block 7a of first shoulder land 7 is respectively separated from pair of first shoulder slits 17, 17, and at least one center circumferential groove 16 at block 11a of first center land 11 is respectively contiguous with pair of center slits 21, 21.

(6) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:

1. A pneumatic tire comprising a plurality of main grooves extending in a tire circumferential direction, and a plurality of lands which are partitioned by the plurality of main grooves and a pair of contact patch ends, wherein:
the plurality of lands comprise
first and second shoulder lands which are arranged so as to be outwardmost in a tire axial direction,
a center land which is arranged nearest to a tire equatorial plane, and
a second mediate land which is arranged between the second shoulder land and the center land;
the first shoulder land comprises a plurality of first shoulder slits which each extend across a full width of the first shoulder land in the tire axial direction, and a first shoulder block which is partitioned by a pair of first shoulder slits which among the plurality of first shoulder slits are mutually adjacent in the tire circumferential direction;
the first shoulder block comprises at least one first shoulder circumferential groove which extends in the tire circumferential direction;
the at least one first shoulder circumferential groove is respectively separated from the pair of first shoulder slits;
the center land comprises a plurality of center slits which each extend across a full width of the center land in the tire axial direction, and a center block which is partitioned by a pair of center slits which among the plurality of center slits are mutually adjacent in the tire circumferential direction;
the center block comprises at least one center circumferential groove which extends in the tire circumferential direction;
the at least one center circumferential groove is respectively contiguous with the pair of center slits;
the second mediate land comprises a plurality of second mediate slits which each extend across a full width of the second mediate land in the tire axial direction,
the plurality of second mediate slits comprise
a first adjacent slit,
a second adjacent slit which is adjacent to the first adjacent slit at a first side in the tire circumferential direction, and
a third adjacent slit which is adjacent to the first adjacent slit at a second side in the tire circumferential direction;
the second mediate land further comprises
a second mediate block which is partitioned by the first adjacent slit and the second adjacent slit, and
a third mediate block which is partitioned by the first adjacent slit and the third adjacent slit;
the second mediate block comprises at least one second mediate circumferential groove which extends in the tire circumferential direction;
all of the at least one second mediate circumferential groove is contiguous with the first adjacent slit but is separated from the second adjacent slit;
the third mediate block comprises at least one third mediate circumferential groove which extends in the tire circumferential direction; and
all of the at least one third mediate circumferential groove is contiguous with the first adjacent slit but is separated from the third adjacent slit.

2. The pneumatic tire according to claim 1 wherein
the plurality of lands further comprise a first mediate land which is arranged between the first shoulder land and the center land;
the first mediate land comprises a plurality of first mediate slits which each extend across a full width of the first mediate land in the tire axial direction, and a first mediate block which is partitioned by a pair of first mediate slits which among the plurality of first mediate slits are mutually adjacent in the tire circumferential direction;
the first mediate block comprises at least one first mediate circumferential groove which extends in the tire circumferential direction; and
the at least one first mediate circumferential groove is respectively separated from the pair of first mediate slits.

3. The pneumatic tire according to claim 2 wherein the at least one first mediate circumferential groove is arranged toward an interior in the tire axial direction from a center in the tire axial direction of the first mediate block.

4. The pneumatic tire according to claim 2 wherein
the first mediate block comprises at least one first mediate sipe which extends in the tire axial direction; and a groove width of the first mediate circumferential groove is greater than a groove width of the at least one first mediate sipe.

5. The pneumatic tire according to claim 4 wherein the at least one first mediate sipe is part of a plurality of first mediate sipes; and
the first mediate circumferential groove intersects all of the first mediate sipes.

6. The pneumatic tire according to claim 5 wherein the at least one first mediate sipe comprises at least one straight portion which extends in straight fashion, and at least one zigzag portion which extends in zigzag fashion; and
the first mediate circumferential groove intersects the at least one straight portion of the at least one first mediate sipe.

7. The pneumatic tire according to claim 1 wherein the at least one second mediate circumferential groove extends so as to be inclined with respect to the tire circumferential direction.

8. The pneumatic tire according to claim 1 wherein the first shoulder block comprises at least one first shoulder sipe which extends in the tire axial direction; and
a groove width of the first shoulder circumferential groove is greater than a groove width of the at least one first shoulder sipe.

9. The pneumatic tire according to claim 8 wherein the at least one first shoulder sipe is part of a plurality of first shoulder sipes; and
the first shoulder circumferential groove intersects all of the first shoulder sipes.

10. The pneumatic tire according to claim 9 wherein the at least one first shoulder sipe comprises at least one straight portion which extends in straight fashion, and at least one zigzag portion which extends in zigzag fashion; and
the first shoulder circumferential groove intersects the at least one straight portion of the at least one first shoulder sipe.

11. The pneumatic tire according to claim 1 wherein the center block comprises at least one center sipe which extends in the tire axial direction; and
a groove width of the center circumferential groove is greater than a groove width of the at least one center sipe.

12. The pneumatic tire according to claim 11 wherein the at least one center sipe is part of a plurality of center sipes; and
the center circumferential groove intersects all of the center sipes.

13. The pneumatic tire according to claim 12 wherein the at least one center sipe comprises at least one straight portion which extends in straight fashion, and at least one zigzag portion which extends in zigzag fashion; and
the center circumferential groove intersects the at least one zigzag portion of the at least one center sipe.

14. The pneumatic tire according to claim 1 wherein the second mediate block comprises at least one second mediate sipe which extends in the tire axial direction; and
a groove width of the second mediate circumferential groove is greater than a groove width of the at least one second mediate sipe.

15. The pneumatic tire according to claim 14 wherein the at least one second mediate sipe is part of a plurality of second mediate sipes; and
the second mediate circumferential groove intersects all of the second mediate sipes.

16. The pneumatic tire according to claim 15 wherein the at least one second mediate sipe comprises at least one straight portion which extends in straight fashion, and at least one zigzag portion which extends in zigzag fashion; and
the second mediate circumferential groove intersects the at least one zigzag portion of the at least one second mediate sipe.

17. The pneumatic tire according to claim 1 wherein the second shoulder land comprises a plurality of second shoulder slits which each extend across a full width of the second shoulder land in the tire axial direction, and a second shoulder block which is partitioned by a pair of second shoulder slits which among the plurality of second shoulder slits are mutually adjacent in the tire circumferential direction;
the second shoulder block comprises at least one second shoulder circumferential groove which extends in the tire circumferential direction; and
the at least one second shoulder circumferential groove is respectively separated from the pair of second shoulder slits.

18. The pneumatic tire according to claim 17 wherein the second shoulder block comprises at least one second shoulder sipe which extends in the tire axial direction;
a groove width of the second shoulder circumferential groove is greater than a groove width of the at least one second shoulder sipe;
the at least one second shoulder sipe is part of a plurality of second shoulder sipes; and
the second shoulder circumferential groove intersects all of the second shoulder sipes;
the at least one second shoulder sipe comprises at least one straight portion which extends in straight fashion, and at least one zigzag portion which extends in zigzag fashion; and
the second shoulder circumferential groove intersects the at least one zigzag portion of the at least one second shoulder sipe.

19. A pneumatic tire comprising a plurality of main grooves extending in a tire circumferential direction, and a plurality of lands which are partitioned by the plurality of main grooves and a pair of contact patch ends, wherein:
the plurality of lands comprise
first and second shoulder lands which are arranged so as to be outwardmost in a tire axial direction,
a center land which is arranged nearest to a tire equatorial plane, and
a second mediate land which is arranged between the second shoulder land and the center land;
the first shoulder land comprises a plurality of first shoulder slits which each extend across a full width of the first shoulder land in the tire axial direction, and a first shoulder block which is partitioned by a pair of first shoulder slits which among the plurality of first shoulder slits are mutually adjacent in the tire circumferential direction;
the first shoulder block comprises at least one first shoulder circumferential groove which extends in the tire circumferential direction;
the at least one first shoulder circumferential groove is respectively separated from the pair of first shoulder slits;
the center land comprises a plurality of center slits which each extend across a full width of the center land in the tire axial direction, and a center block which is partitioned by a pair of center slits which among the plurality of center slits are mutually adjacent in the tire circumferential direction;

the center block comprises at least one center circumferential groove which extends in the tire circumferential direction;

the at least one center circumferential groove is respectively contiguous with the pair of center slits;

the second mediate land comprises a plurality of second mediate slits which each extend across a full width of the second mediate land in the tire axial direction, the plurality of second mediate slits comprise
a first adjacent slit,
a second adjacent slit which is adjacent to the first adjacent slit at a first side in the tire circumferential direction, and
a third adjacent slit which is adjacent to the first adjacent slit at a second side in the tire circumferential direction;

the second mediate land further comprises
a second mediate block which is partitioned by the first adjacent slit and the second adjacent slit, and
a third mediate block which is partitioned by the first adjacent slit and the third adjacent slit;

the second mediate block comprises at least one second mediate circumferential groove which extends in the tire circumferential direction;

all of the at least one second mediate circumferential groove is contiguous with the first adjacent slit but is separated from the second adjacent slit;

the third mediate block comprises at least one third mediate circumferential groove which extends in the tire circumferential direction;

all of the at least one third mediate circumferential groove is contiguous with the first adjacent slit but is separated from the third adjacent slit;

a depth of the first adjacent slit is less than a depth of the second adjacent slit; and the depth of the first adjacent slit is less than a depth of the third adjacent slit.

20. A pneumatic tire comprising a plurality of main grooves extending in a tire circumferential direction, and a plurality of lands which are partitioned by the plurality of main grooves and a pair of contact patch ends, wherein:

the plurality of lands comprise
first and second shoulder lands which are arranged so as to be outwardmost in a tire axial direction,
a center land which is arranged nearest to a tire equatorial plane, and
a second mediate land which is arranged between the second shoulder land and the center land;

the first shoulder land comprises a plurality of first shoulder slits which each extend across a full width of the first shoulder land in the tire axial direction, and a first shoulder block which is partitioned by a pair of first shoulder slits which among the plurality of first shoulder slits are mutually adjacent in the tire circumferential direction;

the first shoulder block comprises at least one first shoulder circumferential groove which extends in the tire circumferential direction;

the at least one first shoulder circumferential groove is respectively separated from the pair of first shoulder slits;

the center land comprises a plurality of center slits which each extend across a full width of the center land in the tire axial direction, and a center block which is partitioned by a pair of center slits which among the plurality of center slits are mutually adjacent in the tire circumferential direction;

the center block comprises at least one center circumferential groove which extends in the tire circumferential direction;

the at least one center circumferential groove is respectively contiguous with the pair of center slits;

the second mediate land comprises a plurality of second mediate slits which each extend across a full width of the second mediate land in the tire axial direction, the plurality of second mediate slits comprise
a first adjacent slit,
a second adjacent slit which is adjacent to the first adjacent slit at a first side in the tire circumferential direction, and
a third adjacent slit which is adjacent to the first adjacent slit at a second side in the tire circumferential direction;

the second mediate land further comprises
a second mediate block which is partitioned by the first adjacent slit and the second adjacent slit, and
a third mediate block which is partitioned by the first adjacent slit and the third adjacent slit;

the second mediate block comprises at least one second mediate circumferential groove which extends in the tire circumferential direction;

all of the at least one second mediate circumferential groove is contiguous with the first adjacent slit but is separated from the second adjacent slit;

the third mediate block comprises at least one third mediate circumferential groove which extends in the tire circumferential direction;

all of the at least one third mediate circumferential groove is contiguous with the first adjacent slit but is separated from the third adjacent slit;

the all of the at least one second mediate circumferential groove is arranged toward an interior in the tire axial direction from a center in the tire axial direction of the second mediate block; and the all of the at least one third mediate circumferential groove intersects a center in the tire axial direction of the third mediate block.

* * * * *